Patented Mar. 11, 1941

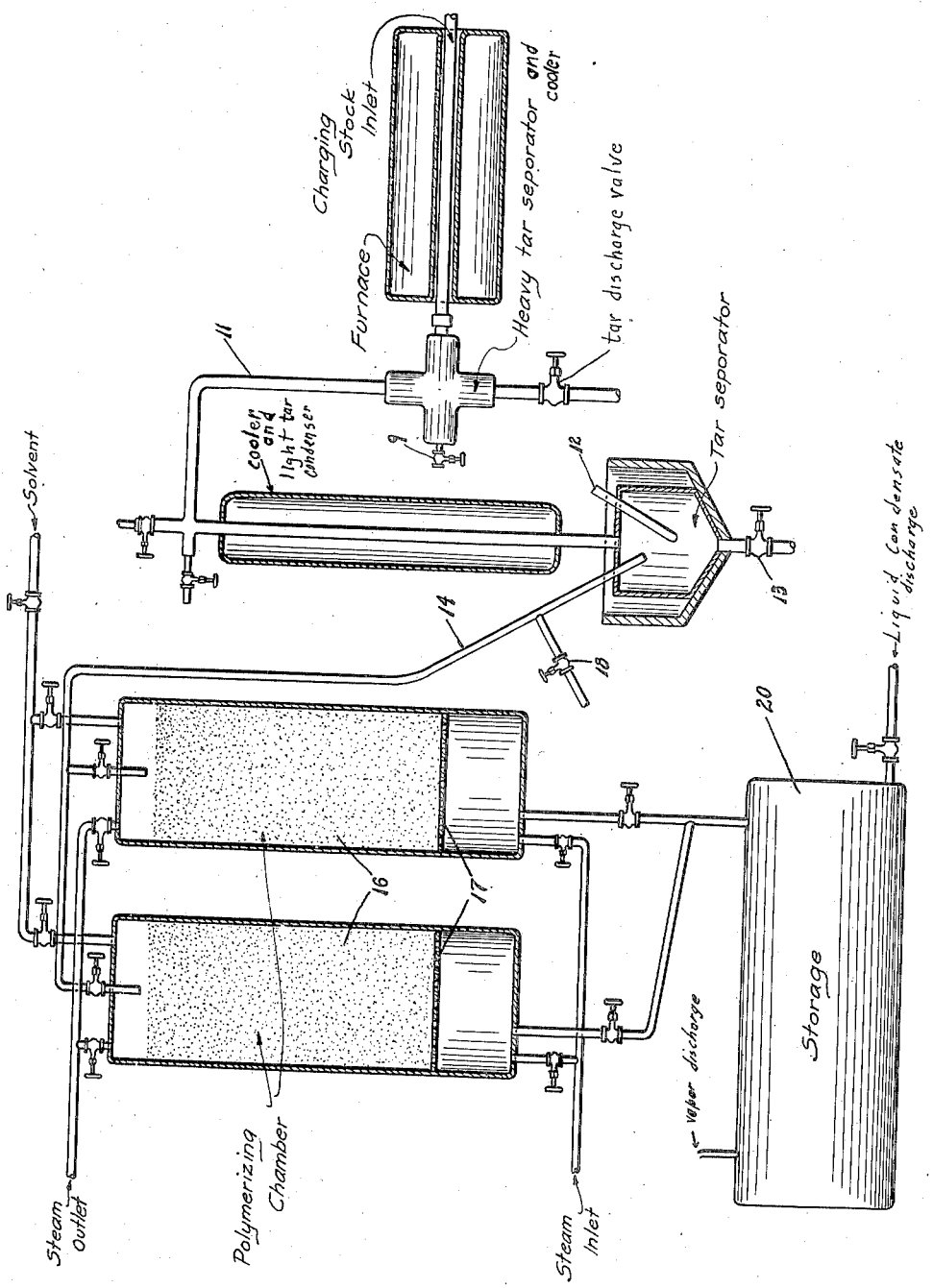

2,234,660

UNITED STATES PATENT OFFICE 2,234,660

MANUFACTURE OF HYDROCARBON RESINS

Charles A. Thomas, Dayton, Ohio, assignor, by mesne assignments, to Monsanto Chemical Company, a corporation of Delaware Application June 1, 1935, Serial No. 24,509

12 Claims. (Cl. 260—93)

This invention relates to the manufacture of polymerized resinous hydrocarbon products having valuable film forming properties when used either alone or after reaction with drying oils, hydroxylated oils of the castor oil type and the like.

One object of the invention is to provide a method of producing a relatively inert hydrocarbon polymer which is neutral, insoluble in acetone and alcohol, soluble in petroleum spirits and aromatic spirits, and which is more stable to light, either alone or in combined form with the aforementioned oils, as compared to known resins such as coumarone-indene resins and the like.

The invention likewise contemplates a method of producing hydrocarbon resin polymers of petroleum hydrocarbon origin by which the valuable yet difficultly recoverable resin forming constituents are converted into a partially polymerized form that is readily recoverable and suitable for resin manufacture having the afore-designated properties.

Another object of the invention is to provide a method of producing resins from a petroleum raw material which is exposed to pyrolytic conditions according to which the resin forming components of the resulting pyrolyzed vapor mixture may be isolated and partially converted to the desired resinous product while at the same time the diluent hydrocarbon vapors may be separated readily from the desired fraction and used again if desired.

An additional object of the invention is to provide a method of producing resins of olefinic-diolefinic origin from cracked petroleum hydrocarbons, having the properties as described above, according to which a cracked petroleum hydrocarbon mixture may be first treated to remove any undesirable tar-like impurities and subsequently is treated to form partially, by polymerization, the resin, and finally completing the resin forming treatment by means of a metallic halide polymerizing agent of the Friedel-Crafts type.

A further object of the invention is to overcome or minimize the tendency of insoluble hydrocarbon polymer formation in the manufacture of synthetic petroleum hydrocarbon resins by first causing a hydrocarbon mixture, rich in diolefines and olefines and which may advantageously include alkyl substituted aromatics, to react under the influence of mild polymerizing agents or conditions, and subsequently completing the polymerization under drastic conditions whereby a resin having the desired solubility and varnish forming characteristics is obtained, while at the same time the formation of insoluble polymerized products is materially reduced or practically obviated.

Another object of the invention resides in the provision of a method of producing valuable hydrocarbon resins by polymerization of a pyrolyzed hydrocarbon and which is characterized in that the polymerization is effected in two stages, one of which is essentially a relatively high temperature, vapor or liquid phase polymerization, the second of which is a relatively low temperature, liquid phase polymerization conducted in the presence of an active catalyst, whereby a product which is soluble in petroleum and aromatic spirits and insoluble in alcohol and acetone is obtained that is suitable for the manufacture of oil varnishes as is set forth hereinafter more fully.

Other objects and advantages of this invention will be apparent from the following description and appended claims.

Reference is herein made to the patent of Charles A. Thomas and Carroll A. Hochwalt, No. 1,836,629, of December 15, 1931; patent of Charles A. Thomas, No. 1,947,626, of Feb. 20, 1934; patent of Charles A. Thomas, No. 1,939,932, of December 19, 1933; patent of Charles A. Thomas, No. 1,982,707, of December 4, 1934; patent of Charles A. Thomas and William H. Carmody, No. 1,982,708, of December 4, 1934; which disclose resins produced by reactions and polymerizations of unsaturated hydrocarbons of various degrees of unsaturation in the presence of metallic halide catalysts hydrolyzable by water, such as aluminum chloride, ferric chloride, ferric bromide, etc. Such general reactions include:

(1) Combination of olefines with diolefines.

(2) Combination of aromatic hydrocarbons with diolefines and/or olefines.

(3) Combination of alkylated aromatic hydrocarbons with diolefines and/or olefines.

(4) Combination of terpenes with diolefines and/or olefines.

In these reactions either cyclic and/or open-chain olefines and/or diolefines may be used and the reactions are generally accompanied or followed by polymerization. With the possible exception of the terpenes, all the types of hydrocarbons mentioned occur in variable quantities in cracked petroleum distillates. Under certain conditions of cracking terpenes do form, particularly those of the sesqui-terpene type; these are valuable for the purpose of my invention.

When a monomeric hydrocarbon mixture which is rich in diolefines is subjected to vigorous polymerization, as by the use of active polymerizing agents, such as aluminum chloride, there is produced a certain amount of polymer that is practically insoluble in ordinary petroleum spirits. While this polymer has certain properties that makes it valuable for some purposes, its insolubility excludes it from the coating composition arts without special solubilizing treatment. I have found that one can practically eliminate the insoluble formation and at the same time obtain a very satisfactory resin for varnish purposes and coating composition purposes if the hydrocarbon mixture is first subjected to a mild polymerization whereby the more reactive components combine or link up, after which further more or less linear or long chain linkage is accomplished by means of more drastic polymerizing agents that results in a finished polymer of excellent solubility, satisfactory iodine number range for varnish making purposes, and otherwise of excellent quality for varnish making purposes.

The first-stage or mild polymerization may be effected by means of surface catalysts and while maintaining the hydrocarbon mixture in vapor phase. Alternatively this first stage polymerization may be effected in liquid phase in the presence of a mild catalyst, as for example clay, fuller's earth and the like, or at somewhat higher temperatures in the absence of any catalyst.

The invention consists essentially of a process for effecting the pyrolysis of petroleum hydrocarbons at 750° C. to 1000° C. and subsequently converting the products to resins by polymerization in two stages, first with a mild catalytic agent such as an adsorptive clay or heat and subsequently with more vigorous agents such as a metallic halide to carry the polymerization to the desired hard resin product stage having the desired solubility characteristics.

The first stage results in partial polymerization of the unsaturated components of the gas mixture or liquids, particularly the diolefines, into relatively less volatile polymers, which are subsequently converted to the desired resin product by polymerizing agents, particularly those of the Friedel-Crafts type in a manner analogous to that described in the foregoing patents. The residual vapors from the cracking operation may be returned to the cracking unit, if desired.

The extent of polymerization during the first stage may be varied by varying the time of contact, the activity of the catalyst, the temperature, etc., to produce the desired degree of partial polymerization.

In general, when vapor phase polymerization is practiced, polymerizing to incipient liquid polymer formation at the temperature prevailing gives satisfactory results. Under these conditions the vapors are cooled advantageously whereby a liquid condensate containing the polymer in solution is formed, although one may continue the polymer formation to a point where all or a substantial proportion of the polymer forming constituents separate without cooling in liquid or semi-liquid form. To complete the resin formation the liquid or semi-liquid polymer is dissolved in an aliphatic or aromatic hydrocarbon solvent and subjected to the action of aluminum chloride, for example, to form the final product. Alternatively, for this purpose, one may advantageously use the hydrocarbon distillate which is recovered by cooling and condensing the vapors which pass through the polymerizing chamber, and which contains resin-forming components when subjected to the action of vigorous polymerizing agents of the Friedel-Crafts type, notably aluminum chloride.

It is important, regardless of what procedure is employed, to check side reactions, particularly reactions which consume diolefines, that ensue under cracking conditions. This may be accomplished conveniently by cooling the pyrolyzed vapors quickly after the pyrolysis either by contact with a cool surface or by admixture of a cool vapor such as steam or water, benzene, etc. In this way it is possible to minimize the loss in yields and obtain a cracked product relatively free of tar which, without the preliminary step of tar separation, may be treated in accordance with this invention to form a final resin product that is satisfactory for many purposes. Where a very light colored product is desired I prefer to separate the tars by a partial condensation, though, as indicated above, this is not necessary.

In practicing this invention, a hydrocarbon stock, such as the off-gas from an oil cracking plant, kerosene, unsweetened kerosene or gasoline, gas oil or a cracked or previously uncracked petroleum stock blended with aromatics (in an amount which may vary though 10%–30% by weight gives satisfactory results), is vaporized and passed through a tube furnace in admixture with a small amount of steam, preferably less than one per cent by volume, at a temperature of the order of 725°–1000° C. The optimum amount of steam will depend upon the conditions of cracking, the type of charging stock, etc. Just sufficient steam is added to prevent carbon deposition in the tubes. For this purpose only a very small amount is necessary, and a large excess should be avoided since it impairs the quality of the product formed for resin manufacturing purposes. The conditions of the pyrolysis should be adjusted to give a good yield of diolefines. After pyrolysis the vapors are cooled as quickly as possible. The degree of cooling which must be effected rapidly is that necessary to prevent side reactions which have been found to take place even as much as 100° C. below the temperature of pyrolysis. As soon as the reacted vapors are reduced in temperature below that at which the objectionable by-product formation is avoided, further cooling to the point at which tars may be separated can be conducted under the usual conditions without regarding the speed of temperature adjustment. After the tar, if any, is separated, the vapors are passed into a polymerizing chamber filled with clay, an adsorbent earth such as fuller's earth or Attapulgus clay or some other surface catalyst capable of promoting polymerization, especially polymerization of the diolefinic constituents, some of which are very volatile liquids at ordinary temperatures. Partial polymerization induces a reduction in the vapor pressure of the diolefinic substances to a degree which makes them readily separable as compared to the monomeric diolefines of which they are formed. The vapors are then cooled to ordinary temperatures whereby a residual gas, which is essentially free of resin forming components, is obtained. This gas may be cracked again to form additional resin forming material or, alternatively, may be separated into constituents for the manufacture of various organic chemicals. Depending upon the raw material employed and the conditions of pyrolysis, one will have a gas mixture of varying composition containing hydrogen, methane, ethylene, propylene, butylene and related hydrocarbons of the aliphatic series. The liquid condensate is treated with a Friedel-Crafts catalyst, preferably aluminum chloride, and the completely polymerized product is then recovered. If a liquid or semi-plastic polymer forms on the surface of the activated clay this is removed by passing the condensate, or petroleum or coal tar spirits, over the surface of the polymerizing agent whereby the material passes into solution and is recovered. The polymer so recovered is combined with the total condensate or is treated separately with aluminum chloride as one may desire to form the hard resin product.

From time to time the clay loses its activity and may be rejuvenated by calcination in an oxidizing atmosphere or more conveniently, when the activity is not completely lost, with superheated steam preferably heated to a temperature of the order of 325° C.–375° C.

In the embodiment above set forth the vapors are conducted through the first stage of polymerization sufficiently rapidly to avoid substantial separation of polymer formed in the polymerizing chamber. The polymerizing effect is sufficient, however, to reduce substantially the volatility of the more volatile of the diolefinic resin forming constituents. As an alternative procedure the time of contact may be prolonged whereby the polymerization proceeds to a stage that results in a reacted mixture wherein the resin forming constituents are substantially less volatile than a major part of the accompanying hydrocarbons. The final resin, after treatment with aluminum chloride, may be used for the purposes herein described but it is possible under these conditions to eliminate a substantial amount of the diluent hydrocarbon as by partial condensation, before undertaking the final polymerization with the metallic halide polymerizing agent. The vapors which result from the partial condensation may be recirculated through the cracking furnace advantageously since they are valuable raw materials for the purpose of the present invention. Thus, for example, this raw material does not require the addition of aromatics, yet the resin product is comparable with that obtained when an aromatic is blended with a petroleum hydrocarbon stock. This is also true of the liquid hydrocarbon which is obtained when one separates the resin from the solvent after the aluminum chloride polymerization.

For the purpose of my invention it is advantageous to use two or more polymerizing chambers in parallel, any one or more of which may be operated independently of the other, in order that the cracking equipment as a whole may be operated continuously notwithstanding the necessity for periodic reactivation of the vapor phase polymerizing catalyst and the necessity for recovering liquid polymer that may be deposited on the surface of the catalyst or in the lower part of the polymerizing chamber.

The initial or first stage of polymerization may be effected alternatively, in liquid phase, by heating the cracked hydrocarbon in an autoclave at 200–250° C., or at somewhat lower temperatures when the treatment is effected in the presence of a material having a positive polymerizing influence.

Briefly, the second stage polymerization involves the addition of small amounts of a condensing agent such as aluminum chloride, to the liquid hydrocarbon mixture containing the polymers while maintaining a low temperature and preferably not in excess of approximately 60° C. small amounts to avoid excessive initial reaction. After the addition of fresh aluminum chloride fails to result in further polymerization, as evidenced by the generation of heat, (for this purpose approximately 15 to 40 grams of aluminum chloride per gallon of hydrocarbon will generally be found sufficient) the condensation is complete and the aluminum chloride is decomposed and separated from the reacted mixture while avoiding thermal decomposition, and the resin is recovered by distilling the accompanying volatile hydrocarbons. The details of the second stage of the polymerization are set forth more fully in the specific examples which follow.

In cracking various hydrocarbon stocks the condensates obtained often have a preponderant proportion of hydrocarbons which yield polymers by aluminum chloride treatment which are insoluble in petroleum hydrocarbon solvents. It has been found that this formation of insoluble polymers is reduced or practically completely obivated by the process described herein. In addition, the resins are improved in melting point and are reactive with castor oil, that is, they combine with castor oil. Coatings deposited from varnishes made from such drying oil-resin combinations are characterized by exceptional flexibility and adherence.

The accompanying drawing illustrates in more or less diagrammatic flow sheet form, a train of equipment which may be employed in practicing the present invention, when the vapor phase polymerization is employed.

The apparatus consists of a cracking furnace which discharges into a temperature controlled, heavy tar separator and preferably into a second temperature controlled tar condenser and separator, after which the residual vapors containing the resin forming constituents, diluted more or less with aliphatic and aromatic hydrocarbons, some of which are liquid at ordinary temperatures, others of which are gaseous, pass to polymerizing chambers.

The polymerizing chambers are connected in parallel and may be operated independently of each other. The material passing through the polymerizing chamber is discharged into a combined condenser and storage vessel from which the liquid is withdrawn periodically into an agitated closed vessel (not shown) where it is treated batchwise with aluminum chloride. Each of the polymerizing chambers is equipped with a solvent inlet near the top, adapted to spray a liquid solvent over the surface catalyst to remove any liquid or semi-solid polymer that accumulates thereon. The catalyst, which is of a granular form having interstices of sufficient volume to permit free flow of gas therethrough, rests on a perforated supporting partition within the chamber. The chamber is provided with charging and discharging doors whereby the catalyst may be introduced or removed. At the base of each of the polymerizing chambers there is provided a steam inlet for the purpose of introducing superheated steam that may be required from time to time to effect activation. The steam is discharged from each of the chambers through a steam discharge valve connection located at the top of the chamber. In order to control the reaction by diluting the composition of the hydrocarbon mixture entering the polymerizing chamber there is provided a valve connection through which steam or some other vapor may be intromixture before such mixture contacts the polymerizing catalyst.

Valves are appropriately positioned to withdraw condensate at various points and to permit convenient access to the tubes in the event of stoppage. A complete system of valves is provided to permit the operation of one of the polymerizing chambers to the exclusion of the other, the details of which are readily understood from the drawing, the need and position of which is well understood by those skilled in the art.

Referring specifically to the elements of the apparatus illustrated in the drawing: The furnace is of tubular type, the tubes of which are preferably composed of a heat resisting alloy such, for example, as nichrome steel. Heat is supplied by electrical resistance wire which encases the length of the tube, or, alternatively, may be supplied by direct fire heat, the latter being satisfactory for large scale operation. The stock to be cracked is introduced preferably in vapor phase and in admixture with just sufficient steam to avoid carbonization in the cracking tube. The rate of flow through the tube is such as to assure turbulent motion of the gas mixture which will, of course, depend upon the inside diameter of the tube. The temperatures on the tube surface which have given the most satisfactory results depend to a certain degree upon the precise nature of the charging stock but usually vary within the range of 825° C. to 925° C. Lower temperatures can, of course, be used but the yield of resin is correspondingly reduced and the quality somewhat impaired. Higher temperatures can be employed, particularly if the rate of flow through the tube is increased, but in any case difficulties caused by over-pyrolysis, carbonization and mechanical difficulties, such as clogging of the tubes, make it preferable to avoid temperatures substantially above 925° C.

It is to be understood that up to this point the precise conditions of operation are important only insofar as the preparation of a cracked raw material having the necessary resin forming olefines and diolefines is concerned, and that I do not limit myself to any specific materials of construction or conditions of pyrolysis which may be suitable for the preparation of such raw material.

The gases issuing from the tube enter a heavy tar separator in which very rapid cooling of the gases is attained in order to avoid so far as possible undesirable side reactions. To this end contact with substantially cooler surfaces can be employed or one may inject an amount of inert vapor such as steam, wet steam, light naphtha, etc. For this purpose there is provided a cooling fluid inlet valve 9 which also serves to afford access to the inside of the cracking tube if need therefor arises. The issuing vapors are conducted through an insulated pipe 11 into a jacketed light tar condenser wherein the temperature of the vapors is adjusted for the first stage of polymerization. Any residual tar drains and settles in the jacketed tar separating chamber which is equipped with a thermometer well 12 and a tar discharge line and valve 13. The vapors issue from the tar separator through a jacketed riser pipe 14 and enter one of the polymerizing chambers at the top where they pass slowly downwardly through the catalyst mass 16 which rests on a perforated diaphragm 17. The liquid polymer which is formed, as well as the residual hydrocarbon vapors pass into the combined condenser and storage vessel 20.

In this connection I have found that whereas for the purpose of cracking the hydrocarbon a small amount of steam is necessary, an excess is objectionable since it results in the formation of excessive quantities of olefinic substances that are not of best quality for resin formation. The addition of steam or diluent hydrocarbon after the cracking as through valve 18 or the cooling fluid inlet 9 is beneficial under conditions where additional temperature control or diluent vapor is needed, though its presence is not indispensable for the success of the process. This feature of restricting the steam preferably to less than one or two per cent by weight of the charge for the cracking operation and subsequently adding additional steam or water or wet steam, relatively cool or diluent hydrocarbon vapors or liquids immediately after the cracking or, alternatively, chilling the gases very rapidly, may be employed to advantage in the two step polymerization processes described herein or in the one step polymerization as is, for example, described in my aforedesignated Patent 1,836,629.

In the course of time the catalyst in one chamber requires revivification which can be accomplished in most instances by treatment with superheated steam. During this revivification the valves are set to conduct the cracked gases to be polymerized through the other chamber. If an appreciable amount of polymer forms on the surface of the catalyst it is desirable that it be removed before the steam treatment by means of a solvent which is introduced at the top of the polymerizing chamber and permitted to percolate over the surface of the catalyst.

In operating the apparatus a kerosene to which is added approximately ten per cent aromatics, such for example as a coal tar naphtha, consisting principally of benzene, toluene and xylene, is cracked at approximately 875° C., by charging the stock at the rate of .53 gallon per hour through a nichrome V-tube of approximately 12.5 feet, having an internal diameter of ¼ inch; just sufficient steam was added to avoid carbonization and clogging of the tube. The issuing vapors are chilled quickly to approximately 600° C. and subsequently the temperature was adjusted in the tar condenser and tar separator preferably below 250° C.–270° C. After passing over the clay the material is condensed and stored in the vessel 20. The gaseous hydrocarbons were exhausted through a vent pipe and consist of approximately forty per cent of the charged stock, the liquid condensate and tar separated representing about sixty per cent of the charged stock.

To 1000 cc. of the liquid condensate which accumulates in the storage vessel and which contains the polymer that is separated in the chamber by passing a portion of the condensate through the solvent line to dissolve the polymer, first having cooled the polymerizing chamber, there is added, after careful drying, aluminum chloride substantially as is described in the above mentioned patents. An excellent yield amounting to 1.4 pounds of resin per gallon of distillate is obtained.

By changing the procedure of the above mentioned patents in this respect that there is added to the hydrocarbon fraction of the condensate, anhydrous calcium oxide or anhydrous calcium sulfate or some similar active drying agent in an amount equivalent to about forty parts per thousand of the condensate, and subsequently adding aluminum chloride in small amounts until the reaction is complete (usually for this purpose fifteen grams per thousand is sufficient), a resin in equally good yield, if not actually better, which is of substantially lighter color, is obtained.

When calcium oxide or similar alkaline earth oxides are employed they serve the dual function of drying the mixture without impairing the action of the aluminum chloride catalyst and at the same time they help in the decomposition of the aluminum chloride catalyst through the medium of the alcoholic ammonia. The alcoholic ammonia may be ordinary aqueous ethyl alcohol which is saturated with ammonia or more conveniently a mixture of aqua ammonia and ethyl alcohol. Other water soluble organic liquids which are soluble in hydrocarbons may be employed such as acetone, methyl alcohol, isopropyl alcohol, etc.

The decomposition and removal of the aluminum chloride is best effected by adding approximately 40 cc. of an alcoholic solution made by adding 40 parts by volume of ammonium hydroxide (specific gravity 0.90) to 60 parts 95% alcohol for each 10 grams of aluminum chloride originally added, and agitating the resulting mixture vigorously until the neutralization of the aluminum chloride is complete. The reacted mixture is then evaporated to approximately half its original volume in order to remove the ammonia and water, and subsequently is filtered thereby separating insoluble materials. The filtrate is evaporated to a hard, brittle resin having a color on the Barrett scale of 3.5 as compared to 6 to 9 obtained when the polymerization with aluminum chloride in the presence of an active drying agent is omitted.

An alternative procedure may be employed differing from the foregoing in that the hydrocarbon vapors are conducted over the surface catalyst at a slower rate whereby a substantial amount of liquid polymer is formed that separates from the hydrocarbon vapors if necessary after partial cooling and subsequent condensation of such hydrocarbon vapors. This polymer is dissolved in benzol or a petroleum naphtha to form a complete solution, after which aluminum chloride is added slowly as in the preceding examples. The subsequent steps of decomposing the catalyst and recovering the resin are substantially the same as have been described heretofore.

When in lieu of the benzol, petroleum naphtha is utilized to dissolve any deposited polymer in the polymerizing chamber preparatory for the aluminum chloride treatment, or the vapors that pass through the polymerizing chamber are condensed and used for this purpose, the yield of finished resin is thus increased, since the condensed vapor usually contains resin forming constituents.

Another embodiment of the invention involves cracking a mixture of unrefined kerosene, that is blended with 30% of a coal tar solvent naphtha consisting essentially of benzene, toluene and xylene, at approximately 875° C. as described heretofore in connection with the previous example. The condensate obtained is freed of tars by distillation under reduced pressures or preferably with the aid of steam, after which it is maintained in an autoclave at a temperature of 245° C. for 10 hours, the pressure in the autoclave reaching approximately 285 pounds per square inch. The Engler distilling characteristics of the product changed from 58° C. for the first drop to 210° C. for 95% before the heat treatment to one in which the first drop distilled at 70° C. and the temperature at 95% was 240° C. after the heat treatment. Furthermore, there is produced a non-volatile polymer, in an amount equal to approximately 12–15% of the charge.

If one removes the resinous residue by distillation and subjects the autoclaved, volatile fraction to aluminum chloride treatment, there is obtained an additional quantity of resin equal to 3–5% of the autoclave's charge. However, by subjecting the entire autoclaved charge to the second stage polymerization, one obtains directly, all of the resin product, in good yield. The method of conducting the second stage polymerization is the same as that described hereinabove.

By adding a small amount of clay or fuller's earth, not substantially in excess of 10% and conducting the autoclave treatment at 190°–210° C. for an hour while maintaining a uniform suspension, one obtains a substantially greater amount of polymerization than is obtained at 240° C. in the absence of material having polymerizing influence.

In either case, however, the insoluble polymer formation, characteristic of straight aluminum chloride polymerization, is practically eliminated completely, and the resin formed has characteristics which compare favorably with the characteristics of the soluble fraction obtained in the single stage aluminum chloride polymerization.

In the foregoing examples all of the cracked distillate fraction has been subjected to the partial or first-stage polymerization. I have found that it is possible to reduce the tendency of the hydrocarbon mixture to discolor when subjected to the first-stage polymerization, particularly the vapor phase polymerization, while at the same time, retain the advantages of the above described embodiments, if one tops the cracked distillate fraction and passes that portion of the fraction boiling below 70° C., more or less, over the contact mass or subjects the same to the liquid phase first-stage polymerization, while reserving the higher boiling fraction (which will be found to distill at not substantially in excess of 225°–240° C.) to be combined with the polymerized lower boiling cut, for the final polymerization. Proceeding in this manner, a resin of satisfactory solubility and excellent varnish forming characteristics is obtained, that is relatively free from tars and objectionable discoloring impurities. Evidently, the low boiling fraction contributes to the insoluble polymer formation whereas the higher boiling cut suffers tar formation even when exposed to moderate polymerizing influence. For the purpose of this embodiment, it is convenient to isolate the low boiling fraction preparatory for the polymerization by fractionally condensing the pyrolyzed vapors. These are diluted with the more or less permanent gases which do not interfere with the surface catalyst reaction, while at the same time the discoloring influence on the higher boiling fraction is avoided.

When the first stage polymerization is conducted under conditions whereby an abundant yield of liquid or viscous fluid polymer is produced as by allowing the hydrocarbon vapors to contact the surface catalyst for a relatively long period of time, the product so obtained can be dissolved in a solvent such as cyclohexanol, pentane and the like, and subsequently hydrogenated with elemental hydrogen in the presence of a hydrogenating catalyst such as platinum or nickel by the well known methods whereby a product of lighter color, having more of a wax-like consistency, that is unusually stable to light and resistant to weathering conditions, is obtained which may be used to advantage for the various uses now made of natural waxes. The increased stability of the product, the fact that it has an acid number approximately 0, and cannot be saponified renders it of special value.

The resin product of this invention obtained by the two stage polymerization may be used for various purposes. Thus, it may be hydrogenated to form a resin of lighter color, inordinate chemical resistance and resistance to normal weathering conditions. It may be combined with drying oils by cooking as is described in the above identified patents and applications or it may be combined with hydroxy glycerides such as castor oil any polyhydroxy alcohols such as glycerol, polyglycerol, diethylene glycol, ethylene glycol, etc. The resin is of good color, soluble in aromatic and petroleum naphtha spirits as are the drying oil and castor oil reaction products. It is insoluble in alcohol, acetone and the like. It forms with oils excellent, durable finishes and undercoats which have, among others, the unique property of resisting discoloration to an inordinate degree as compared to the best present day finishes of comparable durability.

It is to be understood that the present invention is not limited to any specific conditions of cracking or blend of hydrocarbon substances which are subjected to pyrolysis, except insofar as the pyrolyzed products shall be rich in unsaturates. For this purpose, severe cracking conditions are desirable. I have obtained the best results with pyrolyzed vapors obtained by the vapor phase cracking of hydrocarbon mixtures at temperatures of 725°–1000° C. and preferably above 800° C., and not exceeding 950°–1000° C., while maintaining a comparatively low pressure of 50–60 pounds, or just enough to obtain a turbulent flow of vapors through the cracking tubes is sufficient.

What I claim is:

1. In the manufacture of hydrocarbon resins by polymerization of a cracked petroleum hydrocarbon stock rich in olefins and diolefins in the presence of a Friedel-Crafts catalyst and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization to incipient resin formation prior to treatment with the Friedel-Crafts catalyst.

2. The method as defined in claim 1 and further charaterized in that the mild preliminary partial polymerization of the cracked petroleum hydrocarbon stock is effected by treatment under heat and pressure.

3. The method as defined in claim 1 and further characterized in that the mild preliminary partial polymerization of the cracked petroleum hydrocarbon stock is effected by treatment with an adsorptive catalyst of the type of activated fuller's earth.

4. The method as defined in claim 1 and further characterized in that the mild partial polymerization of the cracked petroleum hydrocarbon stock is effected after separation of tars from the cracked petroleum hydrocarbon vapors.

5. In the manufacture of hydrocarbon resins from a cracked petroleum hydrocarbon stock rich in olefins and diolefins and resulting from the pyrolysis of a petroleum hydrocarbon mixture containing aromatic hydrocarbons and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization to incipient resin formation prior to treatment with the Friedel-Crafts catalyst.

6. In the manufacture of hydrocarbon resins by polymerization in the presence of a Friedel-Crafts catalyst of a cracked petroleum hydrocarbon stock rich in olefins and diolefins and resulting from the pyrolysis of a hydrocarbon stock selected from a group consisting of kerosene, gas oil and off-gases from petroleum cracking operations and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization it incipient resin formation prior to treatment with the Friedel-Crafts catalyst.

7. In the manufacture of hydrocarbon resins by polyemerization of a cracked petroleum hydrocarbon stock rich in olefins and diolefins in the presence of a Friedel-Crafts catalyst and an inorganic hydroscopic agent selected from the group consisting of alkaline-earth oxides and calcium sulfate that are inert with respect to the Friedel-Crafts catalyst and the hydrocarbon mixture and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization to incipient resin formation prior to treatment with the Frieded-Crafts catalyst.

8. In the manufacture of hydrocarbon resins by polymerization in the presence of a Friedel-Crafts catalyst of a crackeed petroleum hydrocarbon stock rich in olefins and diolefins and resulting from the cracking of a petroleum hydrocarbon stock at a temperature of 725° C. to 1000° C. under conditions such that the vapors from the cracking operation are chilled rapidly immediately after cracking to avoid side reactions whch would otherwise result in impairing the quality of the cracked product for the purpose of resin formation and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization to incipient resin formation prior to treatment with the Friedel-Crafts catalyst.

9. In the manufacture of hydrocarbon resins by polymerization in the presence of a Friedel-Crafts catalyst of a cracked petroleum hydrocarbon stock rich in olefins and diolefins and resulting from the cracking of a petroleum hydrocarbon stock at a temperature of 725° C. to 1000° C. under conditions such that the vapors from the cracking operation are chilled rapidly immediately after cracking by admixing an inert relatively cool diluent to avoid side reactions which would otherwise result in impairing the quality of the cracked product for the purpose of resin formation and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is subjected to a mild partial polymerization to incipient resin formation prior to treatment with the Friedel-Crafts catalyst.

10. In the manufacture of hydrocarbon resins by polymerization of a normally liquid cracked petroleum hydrocarbon stock rich in olefins and diolefins in the presence of a Friedel-Crafts catalyst and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the normally liquid cracked petroleum hydrocarbon stock is subjected to a mild partial polymerization to incipient resin formation prior to treatment with the Friedel-Crafts catalyst.

11. In the manufacture of hydrocarbon resins by polymerization in the presence of a Friedel-Crafts catalyst of a normally liquid cracked petroleum hydrocarbon stock rich in olefins and diolefins and resulting from the pyrolysis of a hydrocarbon stock selected from a group consisting of kerosene, gas oil and off-gases from petroleum cracking operations and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the normally liquid cracked petroleum hydrocarbon stock is subjected to a mild partial polymerization to incipient resin formation prior to treatment with the Friedel-Crafts catalyst.

12. In the manufacture of hydrocarbon resins by polymerization of a cracked petroleum hydrocarbon stock rich in olefins and diolefins in the presence of a Friedel-Crafts catalyst and which stock when subjected to polymerization in the presence of a Friedel-Crafts catalyst yields resins both soluble and insoluble in petroleum naphtha, the improvement whereby the yield of petroleum-naphtha-soluble resin is increased and the yield of petroleum-naphtha-insoluble resin is decreased, characterized in that the cracked petroleum hydrocarbon stock is separated into two fractions, one fraction having a boiling point above about 70° C. and the other fraction having a boiling point below about 70° C., and the fraction having a boiling point below about 70° C. is subjected to a mild partial polymerization and then combined with the fraction having a boiling point above about 70° C. prior to treatment with the Friedel-Crafts catalyst.

CHARLES A. THOMAS.

CERTIFICATE OF CORRECTION.

Patent No. 2,234,660.　　　　　　　　　　　　　　　March 11, 1941.

CHARLES A. THOMAS.

It is hereby certified that error appears in the printed specification of the above numbered patent requiring correction as follows: Page 5, second column, line 57-58, for "embediment" read --embodiment--; page 6, second column, line 32, claim 6, for "it" read --to--; line 54, claim 7, for "Frieded-Crafts" read --Friedel-Crafts--; line 57, claim 8, for "crackeed" read --cracked--; line 64, same claim, for "whch" read --which--; and that the said Letters Patent should be read with this correction therein that the same may conform to the record of the case in the Patent Office.

Signed and sealed this 6th day of May, A. D. 1941.

Henry Van Arsdale,
(Seal)　　　　　　　　　　　　　　　　　　　Acting Commissioner of Patents.